United States Patent
Kintz et al.

(10) Patent No.: US 7,217,372 B2
(45) Date of Patent: *May 15, 2007

(54) MAGNETORHEOLOGICAL COMPOSITION

(75) Inventors: K. Andrew Kintz, Apex, NC (US); Teresa L. Forehand, Raleigh, NC (US)

(73) Assignee: Lord Corporation, Cary, NC (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/286,303

(22) Filed: Nov. 1, 2002

(65) Prior Publication Data

US 2003/0071238 A1    Apr. 17, 2003

Related U.S. Application Data

(63) Continuation-in-part of application No. 10/154,706, filed on May 23, 2002, which is a continuation-in-part of application No. 09/564,124, filed on May 3, 2000, now Pat. No. 6,395,193.

(51) Int. Cl.
    *H01F 1/44* (2006.01)
(52) U.S. Cl. ............... 252/62.52; 252/62.54
(58) Field of Classification Search ............. 252/62.52, 252/62.56, 62.55, 62.54
    See application file for complete search history.

(56) References Cited

U.S. PATENT DOCUMENTS

| | | |
|---|---|---|
| 2,084,955 A | 6/1937 | Haught |
| 2,772,761 A | 12/1956 | Janson |
| 3,360,475 A | 12/1967 | Rossez |
| 4,356,098 A | 10/1982 | Chagon |
| 4,849,120 A | 7/1989 | Price et al. |
| 5,248,330 A | 9/1993 | Rierson |
| 5,277,281 A | 1/1994 | Carlson et al. |
| 5,354,488 A | 10/1994 | Shtarkman et al. |
| 5,518,639 A | 5/1996 | Luk et al. |
| 5,577,948 A | 11/1996 | Kordonsky |
| 5,645,752 A | 7/1997 | Weiss et al. |
| 5,670,077 A | 9/1997 | Carlson et al. |
| 5,683,615 A | 11/1997 | Munoz |
| 5,705,085 A | 1/1998 | Munoz et al. |
| 5,900,184 A | 5/1999 | Weiss et al. |
| 5,984,056 A | 11/1999 | Agnihorti et al. |
| 5,985,168 A | 11/1999 | Phule |

(Continued)

FOREIGN PATENT DOCUMENTS

WO    WO 01/84568    5/2000

OTHER PUBLICATIONS

German, R.M., "Powder Fabrication", *Powder Metallurgy Science*, 2nd Ed., (3): 107-110 1984, 1999.

(Continued)

*Primary Examiner*—C. Melissa Koslow
(74) *Attorney, Agent, or Firm*—Todd W. Galinski

(57) ABSTRACT

The invention provides a magnetorheological device employing narrow design gap and containing a magnetic-responsive composition exhibiting reduced off-state forces and good performance. Specifically, this invention is directed to a magnetorheological device of defined gap, and employing a magnetic-responsive composition characterized by comprising non-sperical magnetic-responsive particles of average number diameter distribution ($d_{50}$) from 6 to 100 microns and at least one friction-reducing additive that reduces the interparticle friction between the magnetic-responsive particles.

23 Claims, 9 Drawing Sheets

U.S. PATENT DOCUMENTS

| | | |
|---|---|---|
| 6,009,982 A | 1/2000 | Agnihotri et al. |
| 6,245,253 B1* | 6/2001 | Grasshoff et al. ........ 252/62.52 |
| 6,395,193 B1* | 5/2002 | Kintz et al. .............. 252/62.52 |
| 6,503,414 B1* | 1/2003 | Kordonsky et al. ...... 252/62.52 |
| 6,547,983 B2* | 4/2003 | Iyengar ................... 252/62.52 |
| 2003/0209687 A1* | 11/2003 | Iyengar ................... 252/62.52 |
| 2004/0140447 A1* | 7/2004 | Kintz et al. .............. 252/62.52 |

OTHER PUBLICATIONS

Levin, M.L., et al., "Some Features of the Magnetorheological Effect" J. Eng., Phy. Therm., 70(5): 769-772, 1997.

"Further Development of the NBS Magnetic Fluid Clutch", NBS, *Technical News Bulletin*, 34(12): 169-174, Dec. 1950.

* cited by examiner

MAGNETORHEOLOGICAL COMPOSITION

This application is a Continuation-in-Part of co-pending Ser. No. 10/154,706 May 23, 2002 which is a Continuation-in-Part of Ser. No. 09/564,124, May 3, 2000 now U.S. Pat. No. 6,395,193.

FIELD OF THE INVENTION

The invention relates to magnetorheological compositions that have improved performance when exposed to magnetic fields. More specifically, the present invention relates to large particle magnetorheological compositions which have improved controllability.

BACKGROUND OF THE INVENTION

Magnetorheological fluids are magnetic field responsive fluids containing a field polarizable particle component and a liquid carrier component. Magnetorheological fluids are useful in devices or systems for controlling vibration and/or noise. Magnetorheological fluids have been proposed for controlling damping in various devices, such as dampers, shock absorbers, and elastomeric mounts. They have also been proposed for use in controlling pressure and/or torque in brakes, clutches, and valves. Magnetorheological fluids are considered superior to electrorheological fluids in many applications because they exhibit higher yield strengths and can create greater damping forces.

The particle component compositions typically include micron-sized magnetic-responsive particles. In the presence of a magnetic field, the magnetic-responsive particles become polarized and are thereby organized into chains of particles or particle fibrils. The particle chains increase the apparent viscosity (flow resistance) of the fluid, resulting in the development of a solid mass having a yield stress that must be exceeded to induce onset of flow of the magnetorheological fluid. The particles return to an unorganized state when the magnetic field is removed, which lowers the viscosity of the fluid.

Many of the magnetic-responsive particles in the magnetorheological fluids are comprised of spherical ferromagnetic or paramagnetic particles typically 1 to 10 microns in diameter, dispersed within a carrier fluid. Small magnetic particle size permits easy suspension and the design of devices having small gaps. However, there are a number of disadvantages to using small size particles. For example, there is an insufficient supply of fine magnetic-responsive particles for applications in which magnetorheological technology may apply. Moreover, the use of fine particle iron limits the range of metallurgy that can be used due to the process used to obtain such particles. Carbonyl iron, the most commonly used iron, is derived from iron pentacarbonyl salts. The particles are "grown" by precipitation, resulting in a spherical unreduced particle with a very low carbon content. Alternatively, if large particles could be used instead of small particles, blends of various metals could be made and then reduced in size by particle reduction methods. Further, small metal powders may be difficult to process since they can become dust explosion hazards when they approach a micron in size. Additionally, small diameter magnetic-responsive particles are much more expensive than larger particles.

According to Levin et al., "Some Features of the Magnetorheological Effect," *J. Engin. Physics and Thermophysics*, 70(5):769–772 (1997), the most widely used and cheap powders of carbonyl iron contain spherical particles sized to microns. Levin et al. investigated the theological properties of magnetorheological suspensions in a wide concentration range of particles of the disperse ferromagnetic phase in the presence of a magnetic field. The study summary stated that the range of control of the viscous stress increment in a magnetorheological suspension can be broadened by changing the size and shape of the ferromagnetic particles, introducing nonmagnetic particles into the dispersion medium and by heating the medium to the Curie temperature.

A need exists in the art for a magnetorheological composition which utilizes inexpensive large size, non-spherical magnetic-responsive particles and exhibits excellent magnetorheological properties when used in a magnetorheological fluid. This invention provides such a composition.

SUMMARY OF THE INVENTION

The magnetorheological device according to the invention has a specified design gap and employs compositions comprising magnetic-responsive particles having an average number diameter distribution (d50) of from 6 to 100 microns, preferably 10 to 60 microns and at least one additive that reduces the interparticle friction between the magnetic-responsive particles. The additive is selected from an inorganic molybdenum compound, a fluorocarbon polymer or mixtures thereof. In one embodiment, the magnetic-responsive particles are about 60 to about 90 weight percent of the total magnetorheological composition. In a further preferred embodiment, the magnetic-responsive particles are irregular or non-spherical in shape.

The invention also is directed to a magnetorheological fluid comprising non-spherical magnetic-responsive particles having an average number diameter distribution $d_{50}$ of 6 to 100 microns, a carrier fluid and at least one additive that reduces the interparticle friction between the magnetic-responsive particles. The invention is further directed to a magnetorheological fluid comprising non-spherical magnetic-responsive particles produced by water atomization, at least one additive that reduces the interparticle friction between the magnetic-responsive particles, and a carrier fluid.

DETAILED DESCRIPTION OF THE INVENTION

Figure 1:
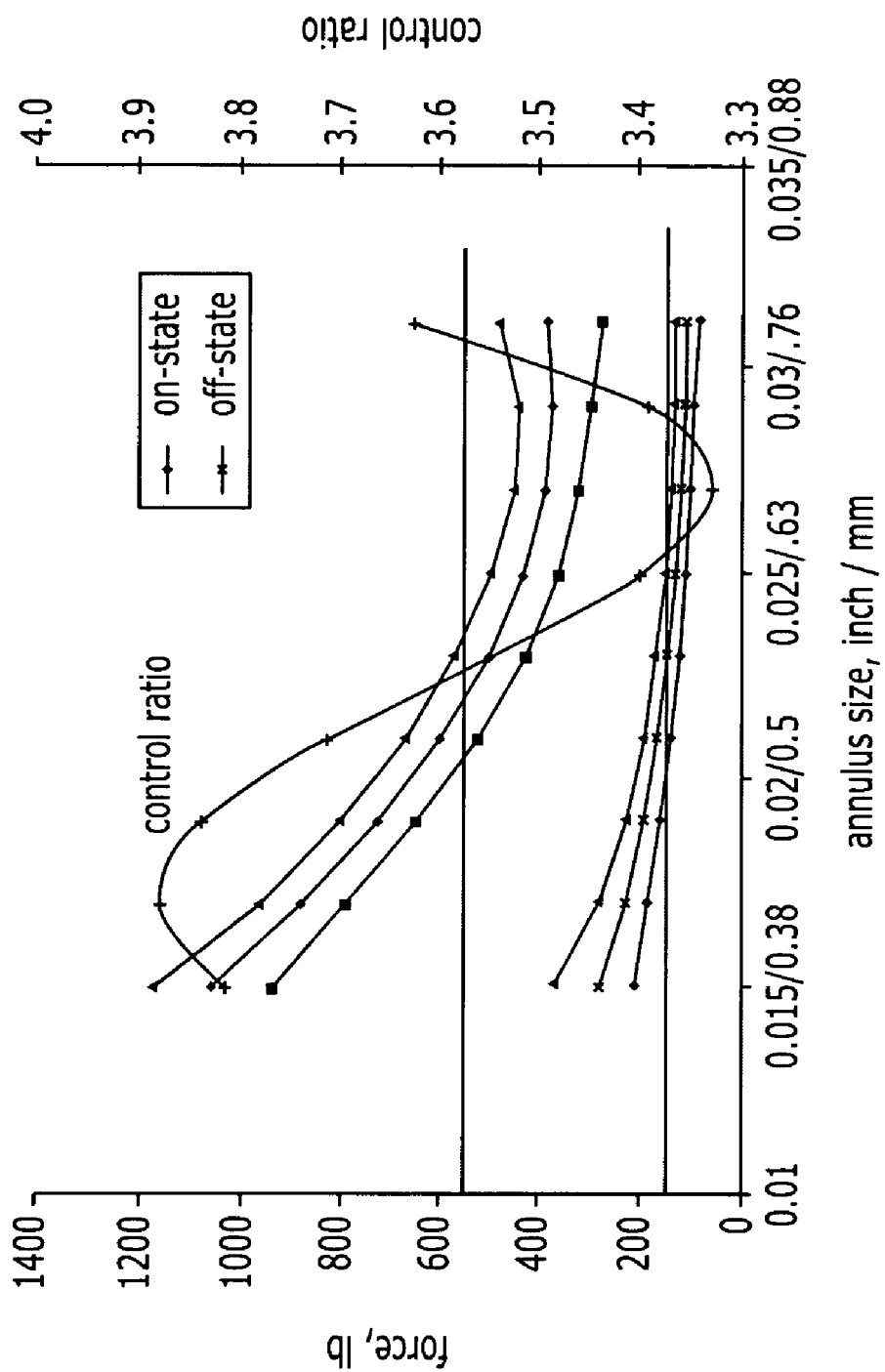
FIG. 1 is a graphical illustration of the inverse relationship between force generated by magnetorheologically controlled fluid and the design gap.

"Force output" as used herein means the damping force, torque, braking force or similar force depending on the device. "Yield strength" is the force required to exceed the yield stress. The "yield stress" is the stress that must be exceeded to induce onset of flow of the magnetorheological composition when subject to the presence of a magnetic field or in the "on-state." The absence of a magnetic field is referred to herein as the "off-state." "On-state forces" as used herein are the resultant forces of a device as a result of applying a magnetic field. "Off-state forces" means the forces generated by a device when no magnetic field is applied.

The present invention provides magnetorheological compositions which can be used in magnetorheological devices employing narrow design gaps and provide improved performance when exposed to magnetic fields. In particular, the magnetorheological compositions provide improved on-state and off-state performance when exposed to magnetic fields. Further, the present invention provides magnetorheological compositions which deliver reduced on-state and off-state forces when used as or in a magnetorheological fluid. It has long been desirable to utilize large, non-spherical particles for magnetorheological fluid compositions due to the expensive nature of the spherical, small-size magnetic-responsive particles presently available for such use. However, it has been discovered that in devices with narrow design gaps, the use of magnetic-responsive particles with irregular shape and larger diameter size in magnetorheological fluids can result in erratic output forces and unpredictability of action once the magnetic-responsive particle size increases to a certain level. Moreover, when large size, non-spherical magnetic-responsive particles are used in narrow designed gap devices, interparticle friction occurs, reducing the performance characteristics of the magnetorheological composition. It has now been discovered that low-cost, large diameter magnetic-responsive particles may be used in magnetorheological compositions with improved performance when a friction-reducing additive according to the present invention is included in the composition. It further has been discovered that even magnetic-responsive particles which are irregular or non-spherical in shape can be utilized in a magnetorheological device having a narrow design gap with good results when such an additive is provided. Thus, the present invention provides a magnetorheological device employing a composition comprising particular sized magnetic-responsive particles and an additive which reduces the interparticle friction between the particles.

A magnetorheological fluid controllable damper has essential components of a stationary housing, movable piston and field generator. The housing contains a volume of magnetorheological (MR) fluid. An MR damper has two principal modes of operation: sliding plate and flow (or valve) modes. Components of both modes will be present in every MR damper, with the force component of the flow or valve mode dominating.

The damper functions as a Coulomb or Bingham type damper, in which the force generated is desiredly independent of piston velocity and large forces can be generated with low or zero velocity. This independence improves the controllability of the damper making the force a function of the magnetic field strength, which is a function of current flow in the circuit.

Figure 7:
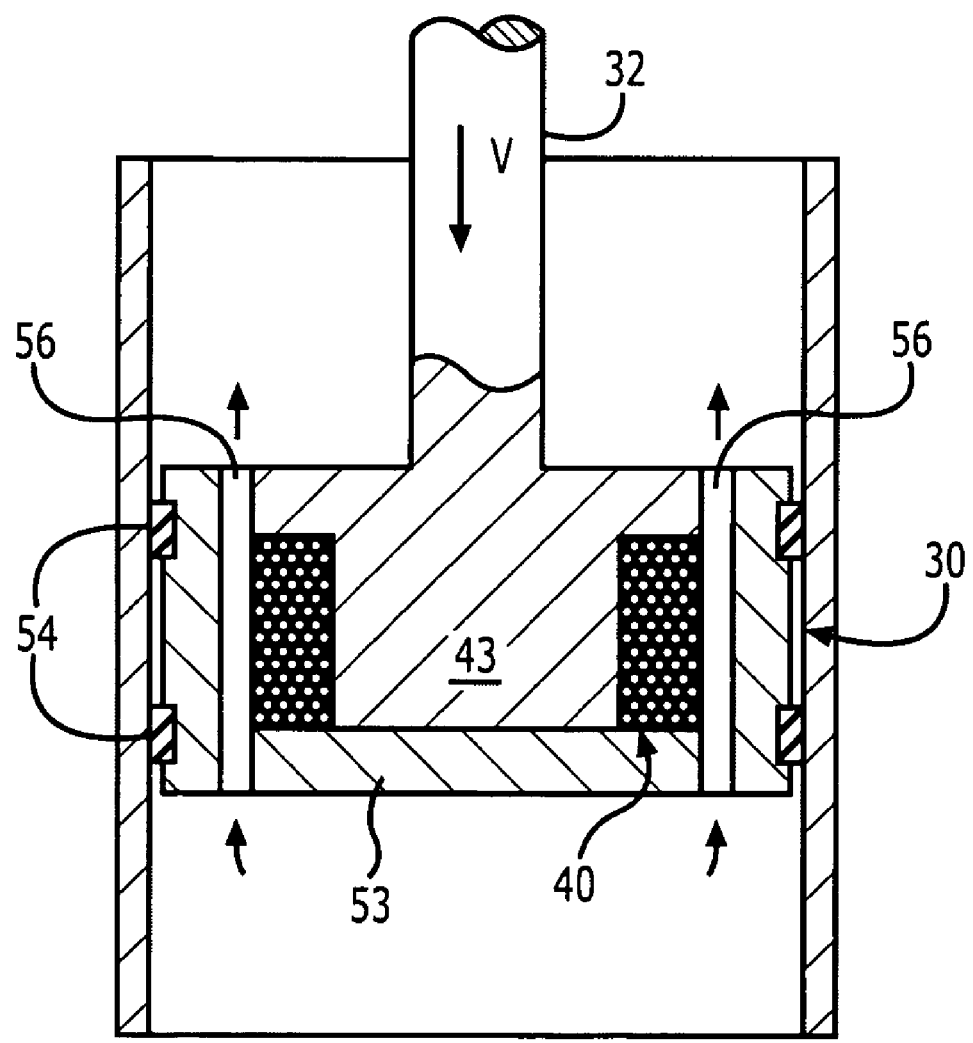
FIG. 7 is a cross sectional side view, a simple schematic of the piston portion of an MR device.

FIG. 7 depicts in crossectional side view, a simple schematic of the piston portion of an MR device, well known in the art and more fully illustrated in U.S. Pat. No. 5,277,281, published Jan. 11, 1994. A piston is located within the housing (not shown). Piston head 30 on piston rod 32 is formed with a smaller maximum diameter than the inner diameter of the housing. In FIG. 7, the depicted piston embodiment contains coil 40 wound on core element 43 and residing in cup member 53. Not shown is the electrical connection to the coil through the piston rod by lead wires, one which is connected to a first end of an electrically conductive rod which extends through piston rod 32, a lead connected to a first end of coil windings and a ground lead from the other end of the coil winding. The upper end of piston rod 32 not shown has threads formed thereon to permit attachment to the damper. An external power supply, which provides a current in the range of 0–4 amps at a voltage of 12–24 volts, depending upon application, is connected to the leads.

Cup member 53 has a plurality of passageways 56 each having a predefined gap formed therein. In other typical embodiments, the gap is provided in an annulus. One or more seals such as at 54 extend about the periphery of cup member 53. Cup member 53 is attached to core element 43 by any fastening means, such as by threaded fasteners, not shown. A coil may alternatively be associated with the housing providing the possibility of a more stationary coil if desired. The device of the present invention utilizes a predefined annular flow gap ranging from 0.1 to 0.75 mm, and preferably 0.4 to 0.6 mm. The gap is desiredly small so as to provide compact MR fluid devices that generate a relatively high on-state force. Particle components, such as carbonyl iron are readily usable in MR devices with these gap sizes and do not produce stiction. Irregular-shaped particles of a larger average particle diameter ($d_{50}$) however exhibit stiction in devices with gap sizes of from 0.08 mm to 0.75 mm, especially 0.08 to 0.4 mm. Stiction, is evidenced by force spikes or irregular output forces of the piston, and is a particular problem at low piston speeds.

The magnetic-responsive particles employed in the present invention may be any solid known to exhibit magnetorheological activity. Typical particle components useful in the present invention are comprised of, for example, paramagnetic, superparamagnetic or ferromagnetic compounds. Specific examples of magnetic-responsive particles which may be used include particles comprised of materials such as iron, iron alloys, iron oxide, iron nitride, iron carbide, carbonyl iron, chromium dioxide, low carbon steel, silicon steel, nickel, cobalt, and mixtures thereof. The iron oxide includes all known pure iron oxides, such as $Fe_2O_3$ and $Fe_3O_4$, as well as those containing small amounts of other elements, such as manganese, zinc or barium. Specific examples of iron oxide include ferrites and magnetites. In addition, the magnetic-responsive particle component can be comprised of any of the known alloys of iron, such as those containing aluminum, silicon, cobalt, nickel, vanadium, molybdenum, chromium, tungsten, manganese and/or copper.

Iron alloys which may be used as the magnetic-responsive particles in the present invention include iron-cobalt and iron-nickel alloys. The iron-cobalt alloys preferred for use in the magnetorheological compositions have an iron:cobalt ratio ranging from about 30:70 to 95:5, and preferably from about 50:50 to 85:15, while the iron-nickel alloys have an iron-nickel ratio ranging from about 90:10 to 99:1, and preferably from about 94:6 to 97:3. The iron alloys may contain a small amount of other elements, such as vanadium, chromium, etc., in order to improve the ductility and mechanical properties of the alloys. These other elements are typically present in an amount that is less than about 3.0% by weight.

The most preferred magnetic-responsive particles for use in the present invention are particles with a high iron content, generally greater than or at least about 95% iron. Preferably, the magnetic-responsive particles used will have less than about 1%, more preferably less than 0.05% by weight carbon. In an especially preferred embodiment, the magnetic-responsive particles will contain about 98% to about 99% iron, and less than about 1% oxygen and nitrogen. Such particles may be obtained, for example, by water atomization or gas atomization of molten iron. Iron particles with these characteristics are commercially available. Examples of magnetic-responsive particles useful in the present invention include Hoeaganes® FPI, 1001 HP and ATW230. Other preferred particles include stainless steel powders such as 430L and 410L.

The particle component according to the invention is typically in the form of a metal powder. The particle size of the magnetic-responsive particles should be selected so that it exhibits multi-domain characteristics when subjected to a magnetic field. Average number particle diameter distribution for the magnetic-responsive particles are generally between about 6 and about 100 microns, preferably between about 10 and about 60 microns. In the most preferred embodiment, the average number particle diameter distribution of the magnetic-responsive powder is about 15 to about 30 microns. The particle component may contain magnetic-responsive particles of a variety of sizes, so long as the average number particle diameter distribution is as set forth. Preferably, the particle component will have at least about 60% particles which are at least 16 microns in diameter. Most preferably, the particle component will have at least about 70% particles which are at least 10 microns in diameter. The size of the magnetic-responsive particles may be determined by scanning electron microscopy, a laser light scattering technique or measured using various sieves, providing a particular mesh size.

Figure 5:
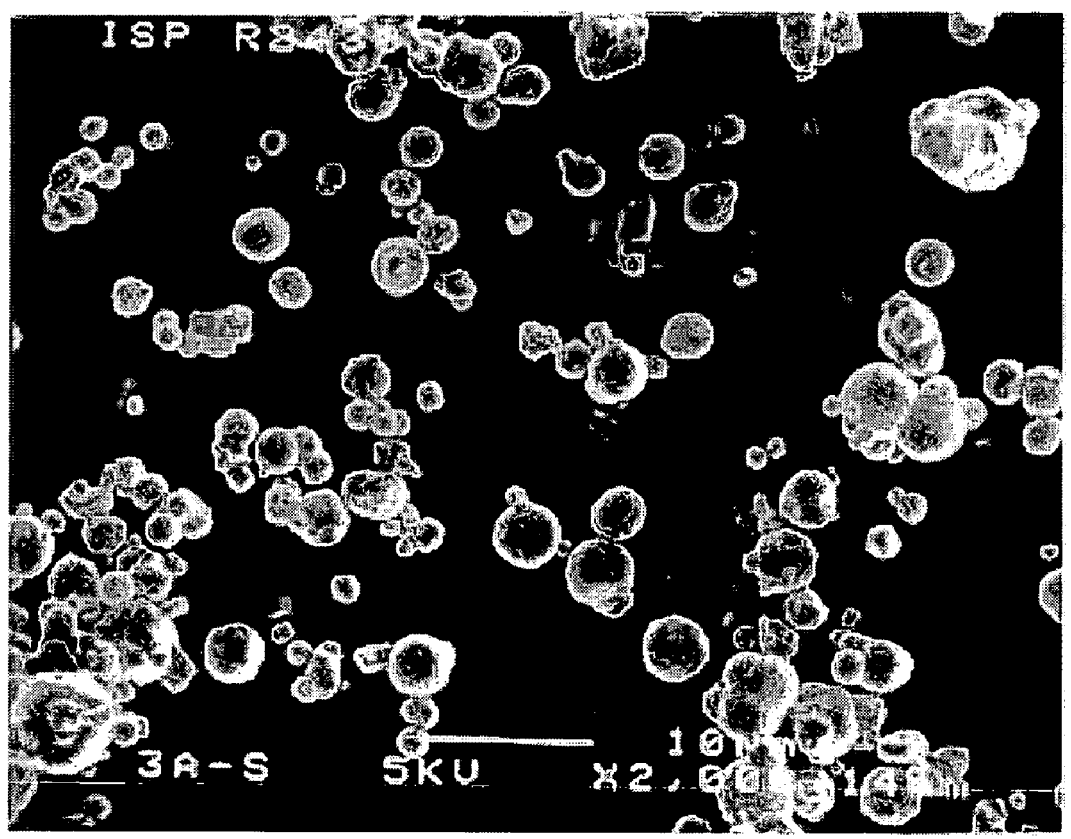
FIG. 5 is a digital image from a scanning electron micrograph of spherical reduced carbonyl iron magnetic-responsive particles.
Figure 6:
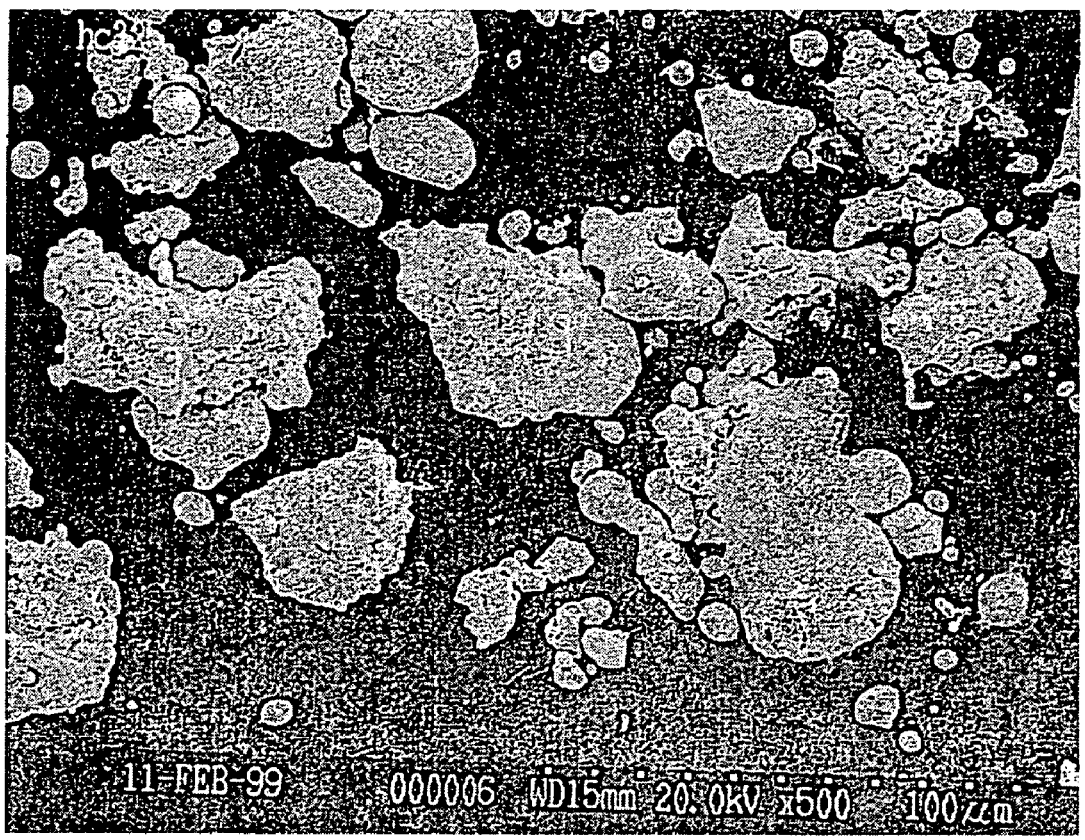
FIG. 6 is a digital image from a scanning electron micrograph of non-spherical iron particles produced by water atomization.

The magnetic-responsive particles of the present invention may be spherical in shape, but will preferably have an irregular or non-spherical shape. A particle distribution of non-spherical magnetic-responsive particles according to the present invention may have some nearly spherical particles within the distribution. However, more than about 50–70% of the particles in the preferred embodiment will have an irregular shape. FIG. 5 is a scanning electron micrograph of spherical carbonyl iron particles derived from pentacarbonyl salts. FIG. 6 is a scanning electron micrograph of non-spherical iron particles which were obtained by water atomization. The content of the iron particles is about the same for both FIGS. 5 and 6, having about 99% iron, less than about 1% nitrogen and 1% oxygen and less than about 0.05% carbon. The most preferred magnetic-responsive particles useful in the present invention are iron particles containing at least 99% iron and of the size and shape obtained by water atomization.

The magnetic-responsive particles are present in the magnetorheological composition in an amount of about 60 to about 90% by weight of the total magnetorheological composition, preferably in an amount of about 65 to about 80% by weight.

The magnetorheological compositions of the invention include one or more additives which reduce the interparticle friction between the magnetic-responsive particles. The magnetorheological compositions thus obtained provide improved performance when used in a magnetorheological fluid composition. In particular, magnetorheological fluids composed of a carrier fluid such as oil and irregularly shaped, large iron particles were found to have high on- and off-state forces when used in a device such as a damper. These fluids also produce sporadic peaks in the performance curves that occur mainly upon change of direction in the damper. In an ideal system, use of additives with irregularly-shaped particles would reduce off-state forces and increase on-state forces. Use of the additives according to the invention were found to lower on-and off-state forces and improve the performance of magnetorheological fluids compared to magnetorheological fluids containing non-spherical magnetic-responsive particles without an additive which reduces interparticle friction. Although it is less desirable to reduce on-state forces, such reduction was minimal in view of the advantages in the reduction of off-state forces. In particular, the reduction of off-state forces ranged from about 2% to about 20%, and the on-state forces were reduced by about 3% to about 20%. While not wishing to be bound by any theory, it is believed that the additives work to coat the metallic particles or to intermingle between the magnetic-responsive particles to serve as a friction-reducing medium. It further is believed that these additives may also interact with the surface of the device to provide a reduction in friction generated between the fluid and the device.

The additives of the present invention useful for the reduction of interparticle friction include inorganic molybdenum compounds or fluorocarbon polymers. Additionally, combinations of inorganic molybdenum compounds may be used, as well as mixtures of fluorocarbon polymers. A combination of any of these compounds, where appropriate, may also be used as the additive in the present invention. Preferably, the inorganic molybdenum compounds will be molybdenum sulfides or molybdenum phosphates. In the most preferred embodiment, the additive is molybdenum disulfide. The preferred fluorocarbon polymers are tetrafluoroethylene, a fluorinated ethylene-propylene polymer or a hexafluoropropylene epoxide polymer. In a most preferred embodiment utilizing a fluorocarbon polymer, the additive is polytetrafluoroethylene. The friction-reducing additive may be present in an amount of about 0.1 to about 10 weight percent based on the total weight of the magnetic-responsive particles. In a preferred embodiment, the friction-reducing additive component is present in an amount of about 1 weight percent to about 50 weight percent, and more preferably from 2 to 4 weight percent, based on the total weight of the magnetic-responsive particles.

The magnetic-responsive particles and the friction-reducing additive may be provided, where appropriate, as a substantially dry powder mixture. The term "substantially dry" means that the powders generally will have less than about 1% water or moisture. In a preferred embodiment, the powders will have less than about 0.5% moisture. The dry powder mixture can be used in the dry form for appropriate applications. In the alternative, a carrier fluid may be added to the powder mixture of magnetic-responsive particles and friction-reducing additive to provide a magnetorheological fluid.

The magnetorheological compositions of the invention may be provided as a dry premixture, absent a carrier fluid, or combined initially with a carrier fluid as is conventional to provide a magnetorheological fluid composition. The amount of magnetorheological composition in the magnetorheological fluid depends upon the desired magnetic activity and viscosity of the fluid. Generally, the amount of magnetorheological composition in the magnetorheological fluid will be from about 5 to about 50, preferably from about 10 to about 30 percent by volume based on the total volume of the magnetorheological fluid.

The carrier component is a fluid that forms the continuous phase of the magnetorheological fluid. The carrier fluid used to form a magnetorheological fluid from the magnetorheological compositions of the invention may be any of the vehicles or carrier fluids known for use with magnetorheological fluids. If the magnetorheological fluid is to be an aqueous fluid, one of skill in the art will understand which of the additives disclosed herein are suitable for such systems. Aqueous systems are described, for example, in U.S. Pat. No. 5,670,077, incorporated herein by reference in its entirety. Where a water-based system is used, the magnetorheological fluid formed may optionally contain one or more of an appropriate thixotropic agent, an anti-freeze component or a rust-inhibiting agent, among others.

In the preferred embodiment, the carrier fluid will be an organic fluid, or an oil-based fluid. Suitable carrier fluids which may be used include natural fatty oils, mineral oils, polyphenylethers, dibasic acid esters, neopentylpolyol esters, phosphate esters, synthetic cycloparaffins and synthetic paraffins, unsaturated hydrocarbon oils, monobasic acid esters, glycol esters and ethers, silicate esters, silicone oils, silicone copolymers, synthetic hydrocarbons, perfluorinated polyethers and esters and halogenated hydrocarbons, and mixtures or blends thereof. Hydrocarbons, such as mineral oils, paraffins, cycloparaffins (also known as naphthenic oils) and synthetic hydrocarbons are the preferred classes of carrier fluids. The synthetic hydrocarbon oils include those oils derived from oligomerization of olefins such as polybutenes and oils derived from high alpha olefins of from 8 to 20 carbon atoms by acid catalyzed dimerization and by oligomerization using trialuminum alkyls as catalysts. Such poly-V-olefin oils are particularly preferred carrier fluids. Carrier fluids appropriate to the present invention may be prepared by methods well known in the art and many are commercially available, such as Durasyn® PAO and Chevron Synfluid PAO.

The carrier fluid of the present invention is typically utilized in an amount ranging from about 50 to about 95, preferably from about 70 to 90, percent by volume of the total magnetorheological fluid.

The magnetorheological fluid may optionally include other components such as a thixotropic agent, a carboxylate soap, an antioxidant, a lubricant and a viscosity modifier, among others. Such optional components are known to those of skill in the art. For example, possible carboxylate soaps include lithium stearate, lithium hydroxy stearate, calcium stearate, aluminum stearate, ferrous oleate, ferrous naphthenate, zinc stearate, sodium stearate, strontium stearate and mixtures thereof. Examples of antioxidants include zinc dithiophosphates, hindered phenols, aromatic amines, and sulfurized phenols. Examples of lubricants include organic fatty acids and amides, lard oil, and high molecular weight organic phosphorus and phosphoric acid esters and examples of viscosity modifiers include polymers and copolymers of olefins, methacrylates, dienes or alkylated styrenes. One of skill in the art would know which of these components would be useful in a particular application. If present, the amount of these optional components typically ranges from about 0.25 to about 10 volume percent, based on the total volume of the magnetorheological fluid. Preferably, the optional ingredient or ingredients will be present in the range of about 0.5 to about 7.5 volume percent based on the total volume of the magnetorheological fluid.

The optional thixotropic agent is any agent which provides thixotropic rheology. The thixotropic agent is selected based on the desired carrier fluid. If the magnetorheological fluid is formed with a carrier fluid which is an organic fluid, a thixotropic agent compatible with such a system may be selected. Thixotropic agents useful for such organic fluid systems are described in U.S. Pat. No. 5,645,752, incorporated herein by reference in its entirety. Preferably, oil-soluble, metal soaps, such as the carboxylate soaps listed above are used.

The viscosity of the magnetorheological fluid containing the magnetorheological compositions of the present invention is dependent upon the specific use of the magnetorheological fluid. One of skill in the art will determine the necessary viscosity according to the desired application for the magnetorheological fluid.

The magnetorheological fluids made from the magnetorheological compositions of the present invention may be used in a number of devices, including brakes, pistons, clutches, dampers, exercise equipment, controllable composite structures and structural elements. Magnetorheological fluids formed with the magnetorheological compositions of the present invention are particularly suitable for use in devices that require exceptional durability such as dampers. As used herein, "damper" means an apparatus for damping motion between two relatively movable members. Dampers include, but are not limited to, shock absorbers such as automotive shock absorbers. The magnetorheological dampers described in U.S. Pat. No. 5,277,281 and 5,284,330, both incorporated herein by reference, are illustrative of magnetorheological dampers that could use the magnetorheological fluids obtained by use of the magnetorheological compositions of the present invention.

The magnetic-responsive particles of the present invention may be obtained in a number of ways. In one embodiment, the metal powder to be used as the magnetic-responsive particles of the invention is obtained by a water atomization process. This method contributes to reduce the total cost of a magnetorheological composition according to the present invention. Water atomization is described in *Powder Metallurgy Science* by Randall M. German, $2^{nd}$ Ed., Chap. 3, "Powder Fabrication," pp. 107–110 (© 1984, 1999), as the most common technique for producing elemental and alloy powders from metals which melt below approximately 1600°C. This method involves directing high pressure water jets against the melt stream, forcing disintegration and rapid solidification. Because of rapid cooling, the powder shape is irregular and rough. FIG. 6 illustrates an example of the particle size and shape obtainable by water atomization.

Although the preferred magnetic-responsive particles for the present invention are obtained by water atomization, the magnetic-responsive particles of the invention may be obtained by any method known in the art for the preparation of such particles. These methods include the reduction of metal oxides, grinding or attrition, electrolytic deposition, metal carbonyl decomposition, rapid solidification, or smelt processing. Various metal powders that are commercially available include straight iron powders, reduced iron powders, insulated reduced iron powders, cobalt powders, and various alloy powders such as [48%]Fe/[50%]Co/[–2%]V powder available from UltraFine Powder Technologies.

The following examples are given to illustrate the invention and should not be construed to limit the scope of the invention.

EXAMPLE 1

Figure 1A:
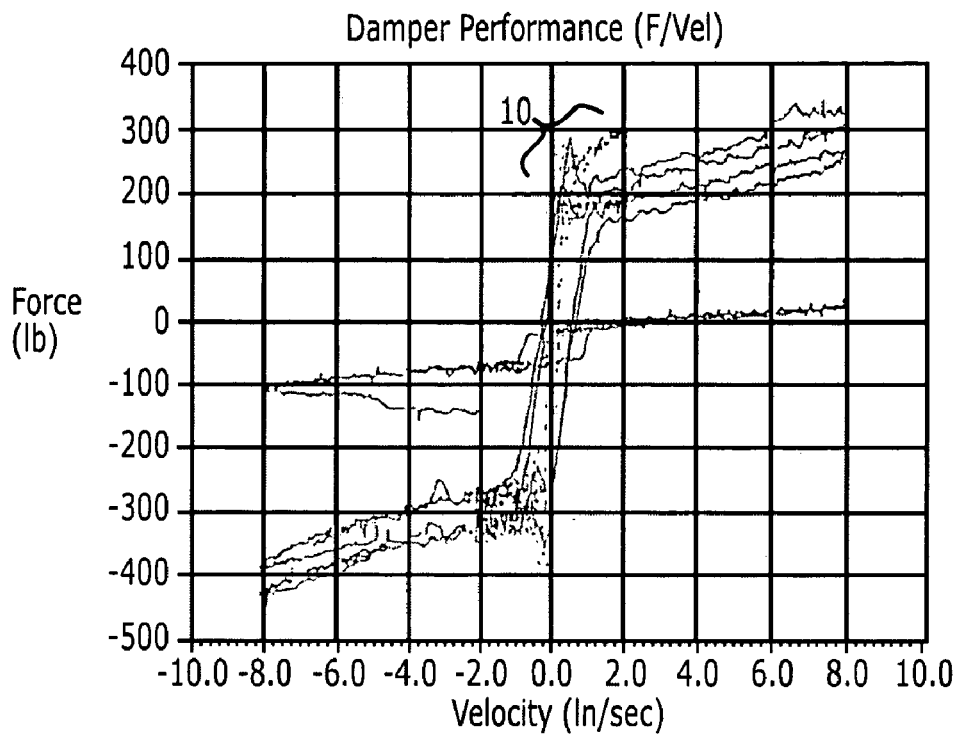
FIG. 1a is a graphical representation of the performance curve obtained with the embodiment of the invention described in Example 1 as measured by force vs. velocity.
Figure 1B:
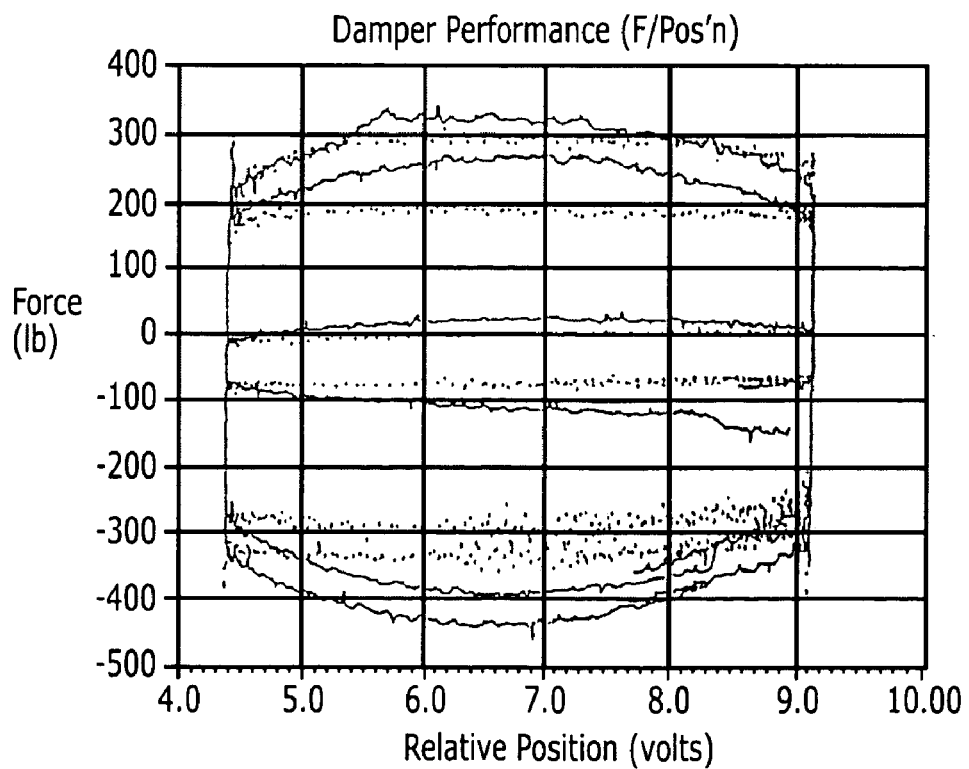
FIG. 1b is a graphical representation of the performance curve obtained with the embodiment of the invention described in Example 1 as measured by force vs. relative position.
Figure 4A:
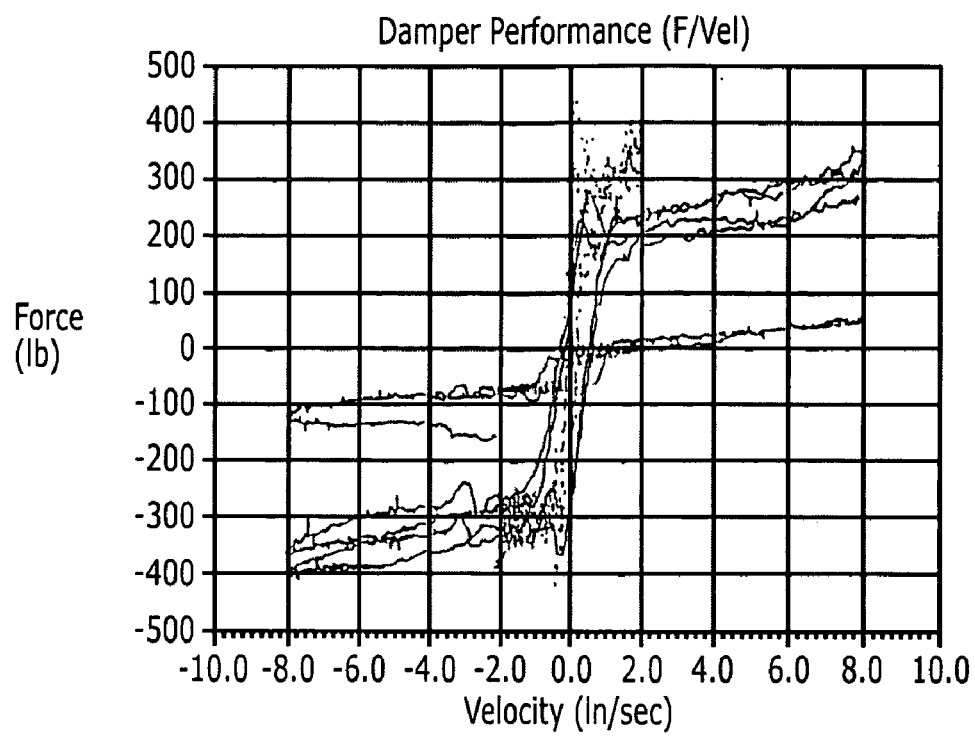
FIG. 4a is a comparative graphical representation of the performance curve obtained with the Comparative Example A as measured by force vs. velocity.
Figure 4B:
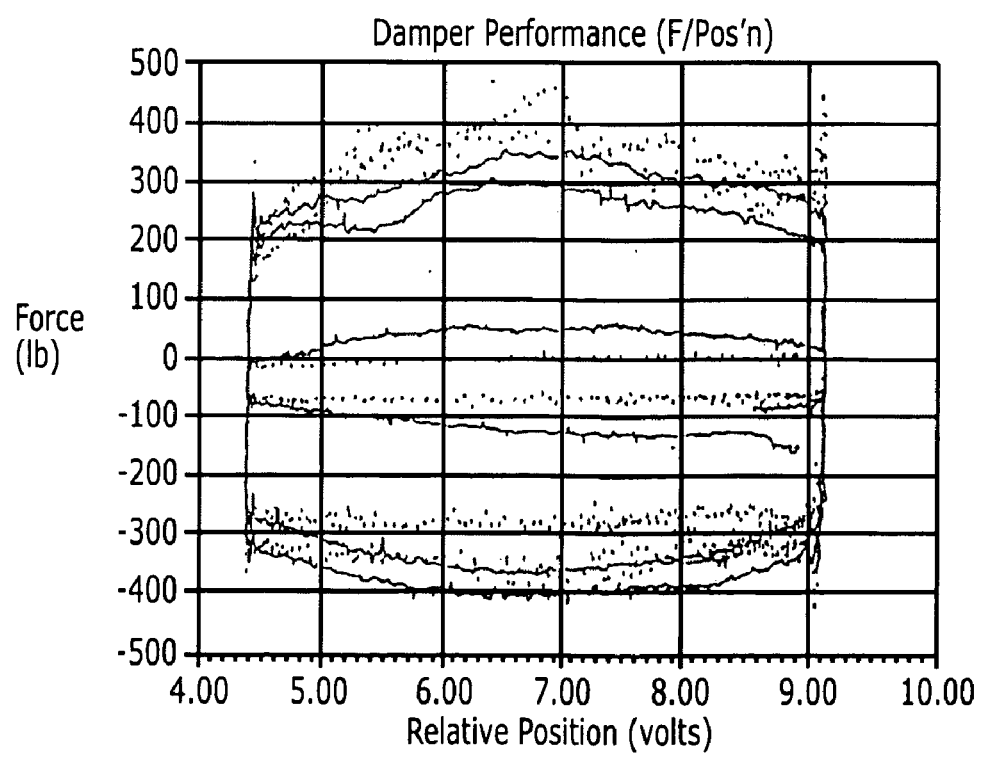
FIG. 4b is a comparative graphical representation of the performance curve obtained with the Comparative Example A as measured by force vs. relative position.

A magnetorheological fluid was prepared by mixing 20% ATW-230 iron (a water-atomized, irregular shaped large particle powder containing 99% iron, less than 1% oxygen, less than 1% nitrogen and 0.01% carbon), 1% lithium hydroxy stearate, 1% molybdenum disulfide and the remaining volume (78%) of a synthetic hydrocarbon oil derived from poly-V-olefin sold under the name Durasyn® 162. The fluid obtained was tested in a truck seat damper and the results illustrated in FIG. 1a, which shows the performance curve of force (lb.) vs. velocity (in sec.), and FIG. 1b, which shows the performance curve of force (lb.) vs. relative position (volts). The test procedure measured the forces produced in the seat damper with a one inch stroke at 2 and 8 in/s and 0, 1 and 2 amps. The force spikes evident in the comparative example (FIGS. 4a and 4b) have been significantly reduced after the addition of 1% molybdenum disulfide to the magnetorheological fluid formulation, as shown in FIGS. 1a and 1b. The off-state forces were decreased from 160 lbs to 130 lbs and the on-state forces were decreased from 590 lbs to 480 lbs.

EXAMPLE 2

Figure 2A:
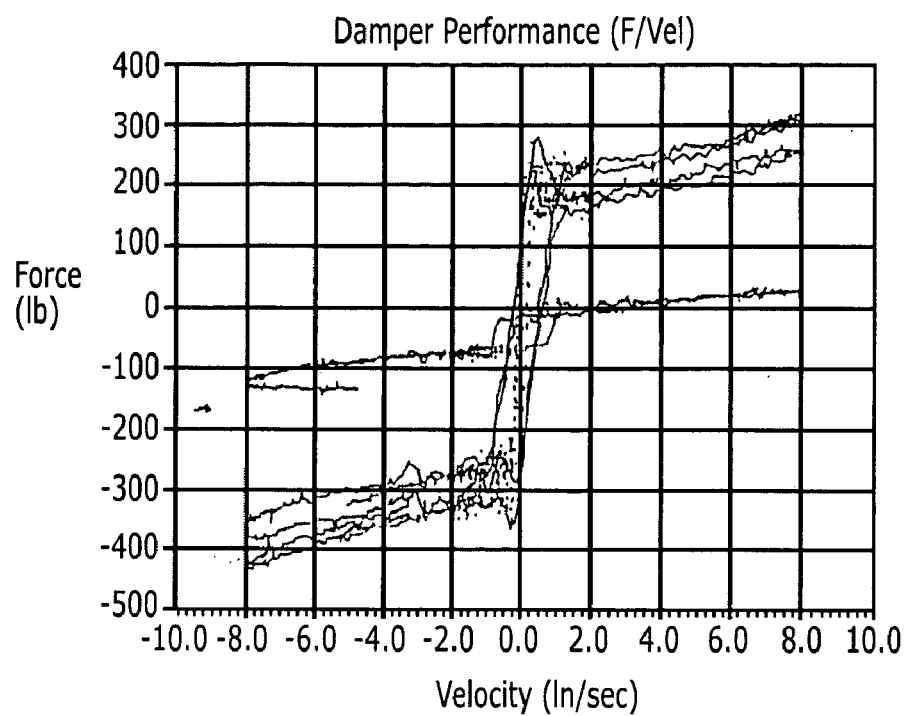
FIG. 2a is a graphical representation of the performance curve obtained with the embodiment of the invention described in Example 2 as measured by force vs. velocity.
Figure 2B:
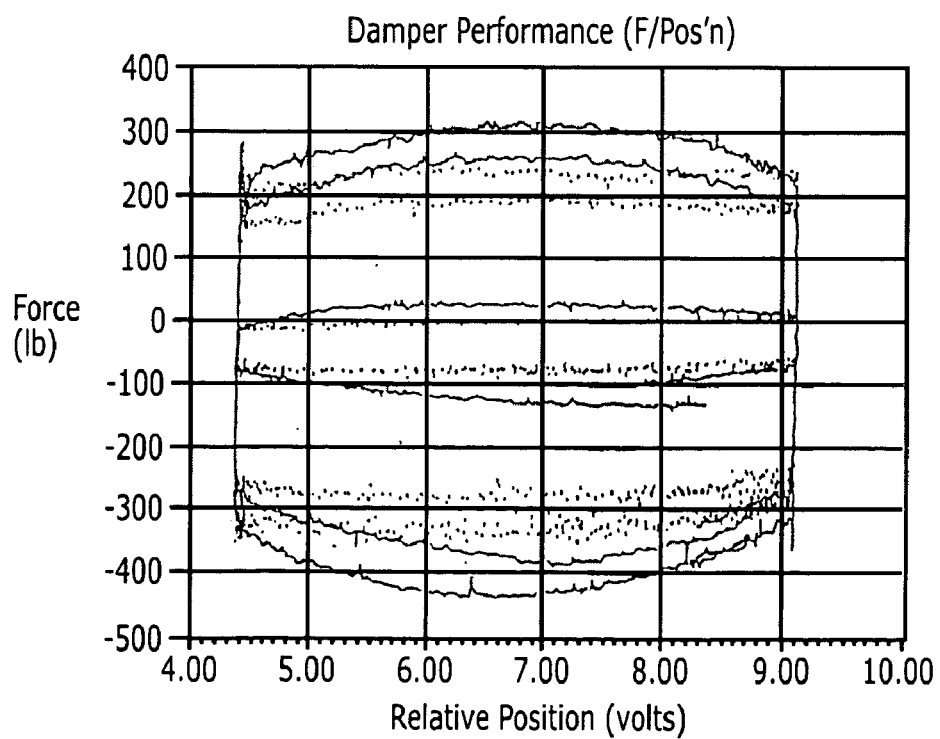
FIG. 2b is a graphical representation of the performance curve obtained with the embodiment of the invention described in Example 2 as measured by force vs. relative position.

A magnetorheological fluid was prepared by mixing 20% ATW-230 iron, 1% lithium hydroxy stearate, 2% molybdenum disulfide and the remaining volume (77%) of a synthetic hydrocarbon oil derived from poly-V-olefin sold under the name Durasyn® 162. The fluid obtained was tested in a truck seat damper and the results illustrated in FIG. 2a, which shows the performance curve of force vs. velocity, and FIG. 2b, which shows the performance curve of force v. relative position. The test procedure measured the forces produced in the seat damper with a one inch stroke at 2 and 8 in/s and 0, 1 and 2 amps. The force spikes evident in the comparative example (FIGS. 4a and 4b) have been significantly reduced after the addition of 2% molybdenum disulfide to the magnetorheological fluid formulation, as shown in FIGS. 2a and 2b. The off-state forces were decreased from 160 lbs to 137 lbs and the on-state forces were decreased from 590 lbs to 470 lbs.

EXAMPLE 3

Figure 3A:
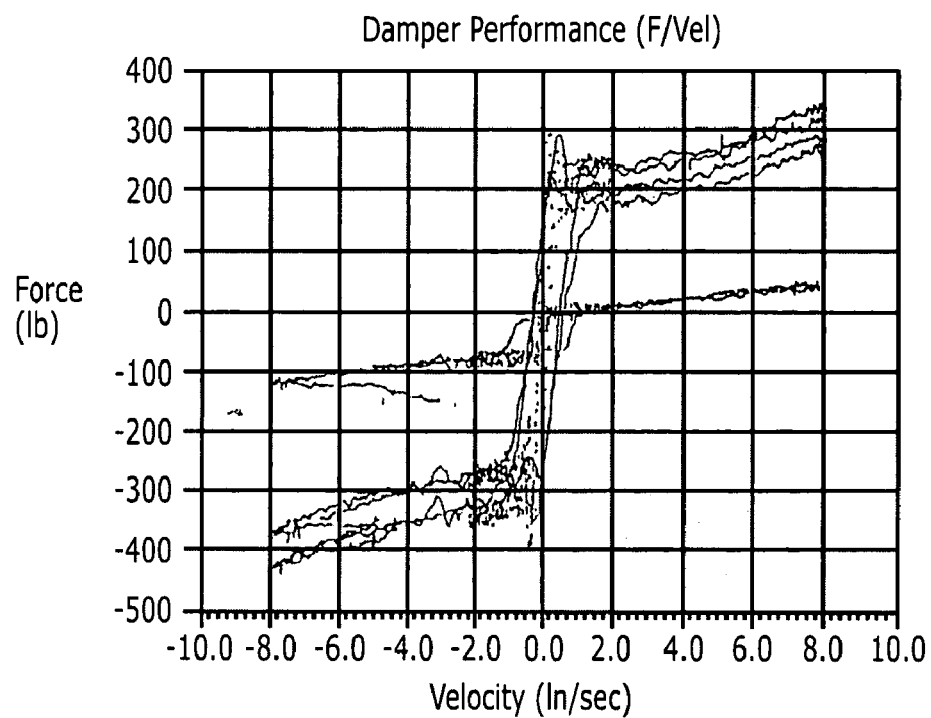
FIG. 3a is a graphical representation of the performance curve obtained with the embodiment of the invention described in Example 3 as measured by force vs. velocity.
Figure 3B:
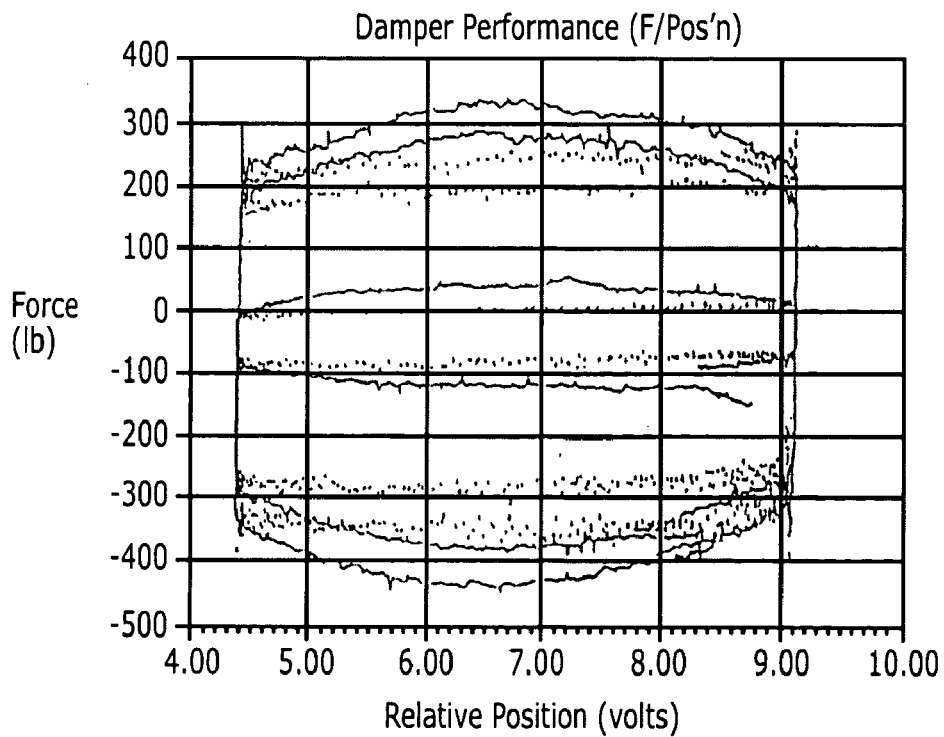
FIG. 3b is a graphical representation of the performance curve obtained with the embodiment of the invention described in Example 3 as measured by force vs. relative position.

A magnetorheological fluid was prepared by mixing 20% ATW-230 iron, 1% lithium hydroxy stearate, 4 g (8 %) teflon and the remaining volume (71%) of a synthetic hydrocarbon oil derived from poly-V-olefin sold under the name Durasyn® 162. The fluid obtained was tested in a truck seat damper and the results illustrated in FIG. 3a, which shows the performance curve of force vs. velocity, and FIG. 3b, which shows the performance curve of force v. relative position. The test procedure measured the forces produced in the seat damper with a one inch stroke at 2 and 8 in/s and 0, 1 and 2 amps. The force spikes evident in the comparative example (FIGS. 4a and 4b) have been reduced after the addition of poly(tetrafluoroethylene) (fluoropolymer) to the magnetorheological fluid formulation, as shown in FIGS. 3a and 3b.

COMPARATIVE EXAMPLE A

A magnetorheological fluid was prepared by mixing 20% ATW-230 iron, 1% lithium hydroxy stearate, and the remaining volume (79%) of a synthetic hydrocarbon oil derived from poly-V-olefin sold under the name Durasyn® 162. The fluid obtained was tested in a truck seat damper and the results illustrated in FIG. 4a, which shows the performance curve of force vs. velocity, and FIG. 4b graphically representing the performance curve of force v. relative position. The test procedure measured the forces produced in the seat damper with a one inch (2.54 cm) stroke at 2 and 8 in/s (5 and 20 cm/s) and 0, 1 and 2 amps. As shown in the FIGS., force spikes (dots above solid lines) were evident when no friction reducing additive was present.

COMPARATIVE EXAMPLE B

Figure 5A:
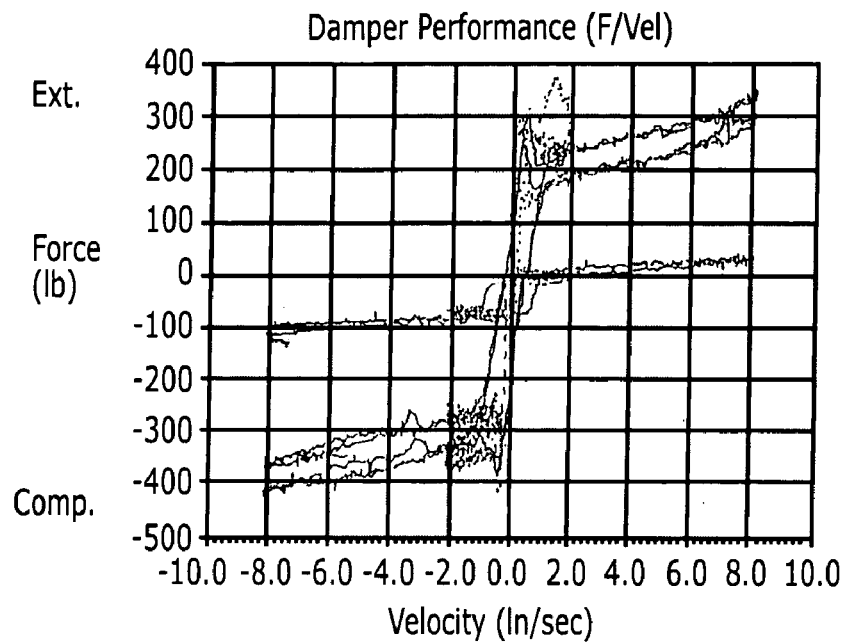
FIG. 5a is a comparative graphical representation of the performance curve obtained with the Comparative Example B as measured by force vs. velocity.
Figure 5B:
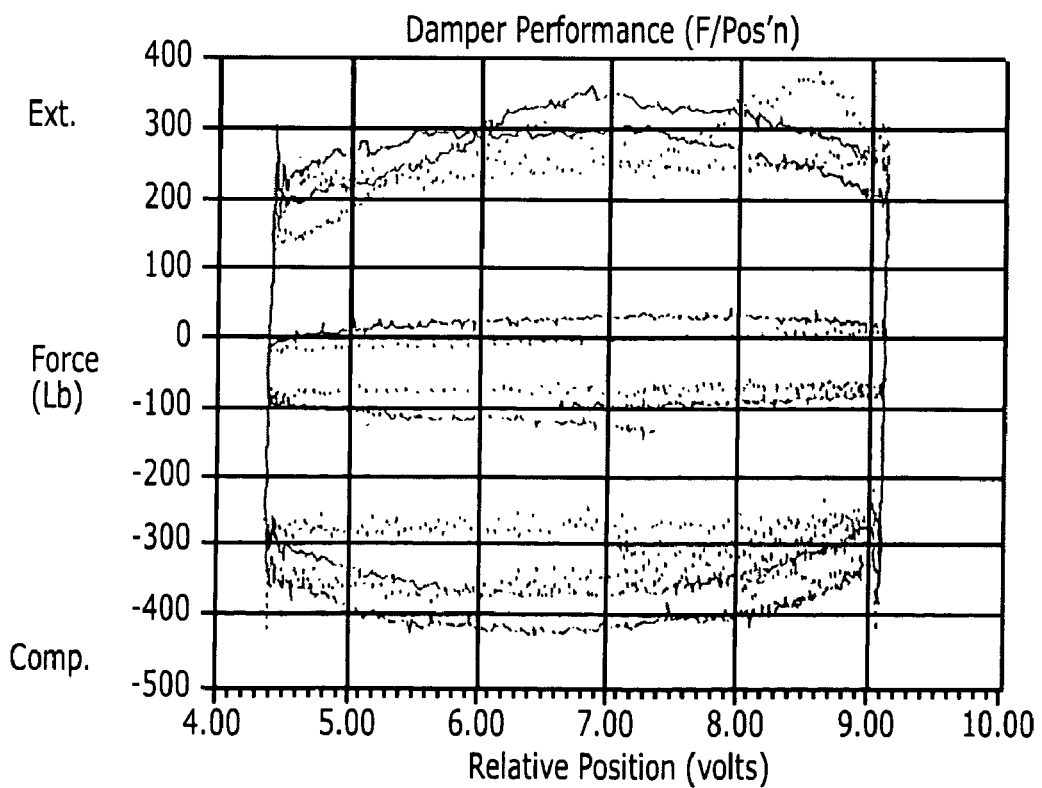
FIG. 5b is a comparative graphical representation of the performance curve obtained with the Comparative Example B as measured by force vs. relative position.

A magnetorheological fluid was prepared by mixing 20% ATW-230 iron, 1% lithium hydroxy stearate, 0.1% of a commercially available organomolybdenum compound and the remaining volume (77%) of a synthetic hydrocarbon oil derived from poly-V-olefin sold under the name Durasyn® 162. The fluid obtained was tested in a truck seat damper and the results illustrated in FIG. 5a, which shows the performance curve of force vs. velocity, and FIG. 5b, which shows the performance curve of force v. relative position. The test procedure measured the forces produced in the seat damper with a one inch stroke at 2 and 8 in/s and 0, 1 and 2 amps. The force spikes as evident in the comparative example (FIGS. 4a and 4b) were not significantly reduced after the addition of organomolybdenum compound to the magnetorheological fluid formulation, as shown in FIGS. 5a and 5b. The off-state forces were decreased from 160 lbs to 140 lbs and the on-state forces decreased only slightly from 590 lbs in Example to 568 lbs. As shown in FIGS. 5a and 5b, force spikes (dots above solid lines) were evident when organomolybdenum friction reducing additive was present.

While the invention has been described in detail and with reference to specific embodiments thereof, it will be apparent to one skilled in the art that various changes and modifications can be made without departing from the spirit and scope thereof.

We claim:

1. A magnetorheological fluid useful for devices employing narrow design gaps, characterized by having non-spherical magnetic-responsive particles having an average number diameter distribution of 6 to 100 microns, a carrier fluid, and at least one additive comprising an inorganic molybdenum that reduces interparticle friction between the magnetic-responsive particles.

2. The magnetorheological fluid of claim 1 wherein the inorganic molybdenum compound comprises a molybdenum sulfide or a molybdenum phosphate.

3. The magnetorheological fluid of claim 1 wherein the inorganic molybdenum compound comprises molybdenum disulfide.

4. The magnetorheological fluid of claim 2, further comprising one or more of a thixotropic agent, a carboxylate soap, an antioxidant, a lubricant or a viscosity modifier.

5. The magnetorheological fluid of claim 1 wherein the non-spherical magnetic-responsive particles comprise iron particles containing at least about 95% iron obtained by water atomization.

6. The magnetorheological fluid of claim 1 wherein the non-spherical magnetic-responsive particles have an average number diameter distribution of about 10 to about 60 microns.

7. The magnetorheological fluid of claim 1 wherein the additive further comprises a fluorocarbon polymer.

8. The magnetorheological fluid of claim 7 wherein the fluorocarbon polymer comprises polytetrafluoroethylene.

9. The magnetorheological fluid of claim 7 wherein the non-spherical magnetic-responsive particles have an average number diameter distribution of about 10 to about 60 microns.

10. The magnetorheological fluid of claim 9 wherein the non-spherical magnetic-responsive particles have an average number diameter distribution of about 15 to about 30 microns.

11. A magnetorheological composition comprising non-spherical magnetic-responsive particles having an average number diameter distribution of about 10 to about 60 microns and molybdenum disulfide or polytetrafluoroethylene in an amount of 0.1 to 10 weight percent of the magnetic-responsive particles.

12. The magnetorheological fluid of claim 2 wherein the non-spherical magnetic-responsive particles comprise iron particles having at least 95% iron obtained by water atomization.

13. The magnetorheological fluid of claim 7 wherein the non-spherical magnetic-responsive particles comprise iron particles having at least 95% iron obtained by water atomization.

14. A magnetorheological fluid comprising non-spherical magnetic-responsive particles produced by water atomization, at least one additive that reduces the interparticle friction between the magnetic-responsive particles, and a carrier fluid.

15. A magnetorheological fluid comprising non-spherical magnetic-responsive particles having an average number diameter distribution of 6 to 100 microns, a non-polar carrier fluid, and at least one additive that reduces interparticle friction between the magnetic-responsive particles.

16. The magnetorheological fluid of claim 15 wherein the non-polar carrier fluid comprises at least one of natural fatty oil, mineral oil, polyphenylether, dibasic acid ester, neopentylpolyol ester, phosphate ester, polyester, cycloparaffin oil, paraffin oil, unsaturated hydrocarbon oil, synthetic hydrocarbon oil, monobasic acid ester, glycol ester, glycol ether, synthetic hydrocarbon, perfluorinated polyether or halogenated hydrocarbon.

17. The magnetorheological fluid of claim 15 wherein the additive comprises at least one of a molybdenum sulfide or a molybdenum phosphate.

18. The magnetorheological fluid of claim 15, further comprising one or more of a thixotropic agent, a carboxylate soap, an antioxidant, a lubricant or a viscosity modifier.

19. The magnetorheological fluid of claim 15, wherein the non-spherical magnetic-responsive particles comprise iron particles containing at least about 95% iron obtained by water atomization.

20. The magnetorheological fluid of claim 15, wherein the non-spherical magnetic-responsive particles have an average number diameter distribution of about 10 to about 60 microns.

21. The magnetorheological fluid of claim 15 wherein the additive comprises a fluorocarbon polymer.

22. The magnetorheological fluid of claim 21 wherein the fluorocarbon polymer comprises polytetrafluoroethylene.

23. The magnetorheological fluid of claim 15 wherein the non-spherical magnetic-responsive particles have an average number diameter distribution of about 15 to about 30 microns.

* * * * *